United States Patent
Kopp et al.

(10) Patent No.: US 10,708,284 B2
(45) Date of Patent: Jul. 7, 2020

(54) PRIVATE-LEARNED IDS

(71) Applicant: Cisco Technology, Inc., San Jose, CA (US)

(72) Inventors: Martin Kopp, Beroun (CZ); Petr Somol, Marianske Lazne (CZ); Tomas Pevny, Praha-Modrany (CZ); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 15/643,573

(22) Filed: Jul. 7, 2017

(65) Prior Publication Data

US 2019/0014134 A1    Jan. 10, 2019

(51) Int. Cl.
| | |
|---|---|
| *H04L 29/06* | (2006.01) |
| *G06N 99/00* | (2019.01) |
| *G06F 3/01* | (2006.01) |
| *G06N 20/00* | (2019.01) |
| *G06N 20/20* | (2019.01) |
| *G06N 5/04* | (2006.01) |

(52) U.S. Cl.
CPC ............ *H04L 63/1416* (2013.01); *G06F 3/01* (2013.01); *G06N 20/00* (2019.01); *G06N 20/20* (2019.01); *G06N 99/005* (2013.01); *G06N 5/045* (2013.01); *H04L 63/145* (2013.01)

(58) Field of Classification Search
CPC ... H04L 63/1416; H04L 63/145; H04L 29/06; G06N 99/00; G06N 20/00; G06F 3/01
USPC ............. 726/22–26; 709/206, 223; 713/198, 713/193–194
See application file for complete search history.

(56) References Cited

U.S. PATENT DOCUMENTS

| | | | | |
|---|---|---|---|---|
| 7,225,343 | B1 * | 5/2007 | Honig ................... | G06F 21/554 713/194 |
| 8,402,543 | B1 * | 3/2013 | Ranjan ................ | H04L 63/1416 709/223 |
| 8,544,087 | B1 * | 9/2013 | Eskin .................... | G06F 21/552 726/22 |
| 8,682,812 | B1 * | 3/2014 | Ranjan ................ | H04L 63/1425 706/12 |
| 8,745,731 | B2 | 6/2014 | Achan et al. | |
| 8,762,298 | B1 * | 6/2014 | Ranjan ..................... | G06N 5/02 706/12 |
| 9,223,972 | B1 | 12/2015 | Vincent et al. | |
| 9,292,688 | B2 | 3/2016 | Avasarala et al. | |
| 9,306,966 | B2 | 4/2016 | Eskin et al. | |
| 9,686,173 | B1 * | 6/2017 | Giordano .............. | H04L 41/142 |

(Continued)

*Primary Examiner* — Saleh Najjar
*Assistant Examiner* — Khalid M Almaghayreh
(74) *Attorney, Agent, or Firm* — Behmke Innovation Group LLC; James M. Behmke; Jonathon P. Western

(57) ABSTRACT

In one embodiment, a device in a network maintains a plurality of machine learning-based detectors for an intrusion detection system. Each detector is associated with a different portion of a feature space of traffic characteristics assessed by the intrusion detection system. The device provides data regarding the plurality of detectors to a user interface. The device receives an adjustment instruction from the user interface based on the data provided to the user interface regarding the plurality of detectors. The device adjusts the portions of the feature space associated with the plurality of detectors based on the adjustment instruction received from the user interface.

16 Claims, 12 Drawing Sheets

(56) References Cited

U.S. PATENT DOCUMENTS

| | | | |
|---|---|---|---|
| 2005/0286522 A1* | 12/2005 | Paddon | H04L 63/0227 370/389 |
| 2008/0306715 A1* | 12/2008 | Tsai | G06F 21/55 703/2 |
| 2012/0284791 A1* | 11/2012 | Miller | G06F 21/554 726/22 |
| 2013/0097704 A1* | 4/2013 | Gavrilut | G06F 21/56 726/23 |
| 2015/0052606 A1 | 2/2015 | Romero Bueno et al. | |
| 2015/0058982 A1* | 2/2015 | Eskin | G06F 16/84 726/23 |
| 2016/0149936 A1* | 5/2016 | Pegna | H04L 63/1416 726/23 |
| 2016/0191559 A1* | 6/2016 | Mhatre | H04L 63/1416 726/23 |
| 2016/0226894 A1* | 8/2016 | Lee | H04L 63/1416 |
| 2018/0144130 A1* | 5/2018 | Wolff | G06K 9/6218 |
| 2018/0234302 A1* | 8/2018 | James | H04L 41/145 |
| 2019/0138721 A1* | 5/2019 | Wojnowicz | G06F 21/56 |

* cited by examiner

PRIVATE-LEARNED IDS

TECHNICAL FIELD

The present disclosure relates generally to computer networks, and, more particularly, to a private-learned intrusion detection system (IDS).

BACKGROUND

Intrusion detection systems (IDSs) and other anti-malware systems are powerful, but challenging to maintain. In particular, to achieve acceptable efficacy, such security systems require constant updates and/or external synchronization, to keep up with results of expensive manual threat analyses by highly-specialized teams of security experts. More and more, these information sources are being connected, allowing for a more solid verdict to be made based on global data. In other words, connectivity and synchronization are becoming increasingly ubiquitous in network security systems.

The move towards connected and synchronized network security systems is a significant advancement in the security field, but also fails to take into account certain entities that intentionally prevent or limit connections with the outside world. For example, many networks for government, military, critical infrastructure, etc., are isolated and cannot leverage the same security update techniques as traditional networks. Instead, these entities typically employ whole in-house teams of security experts able to create security updates internally and/or perform extensive verification testing on security updates from external sources before deployment in the isolated network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
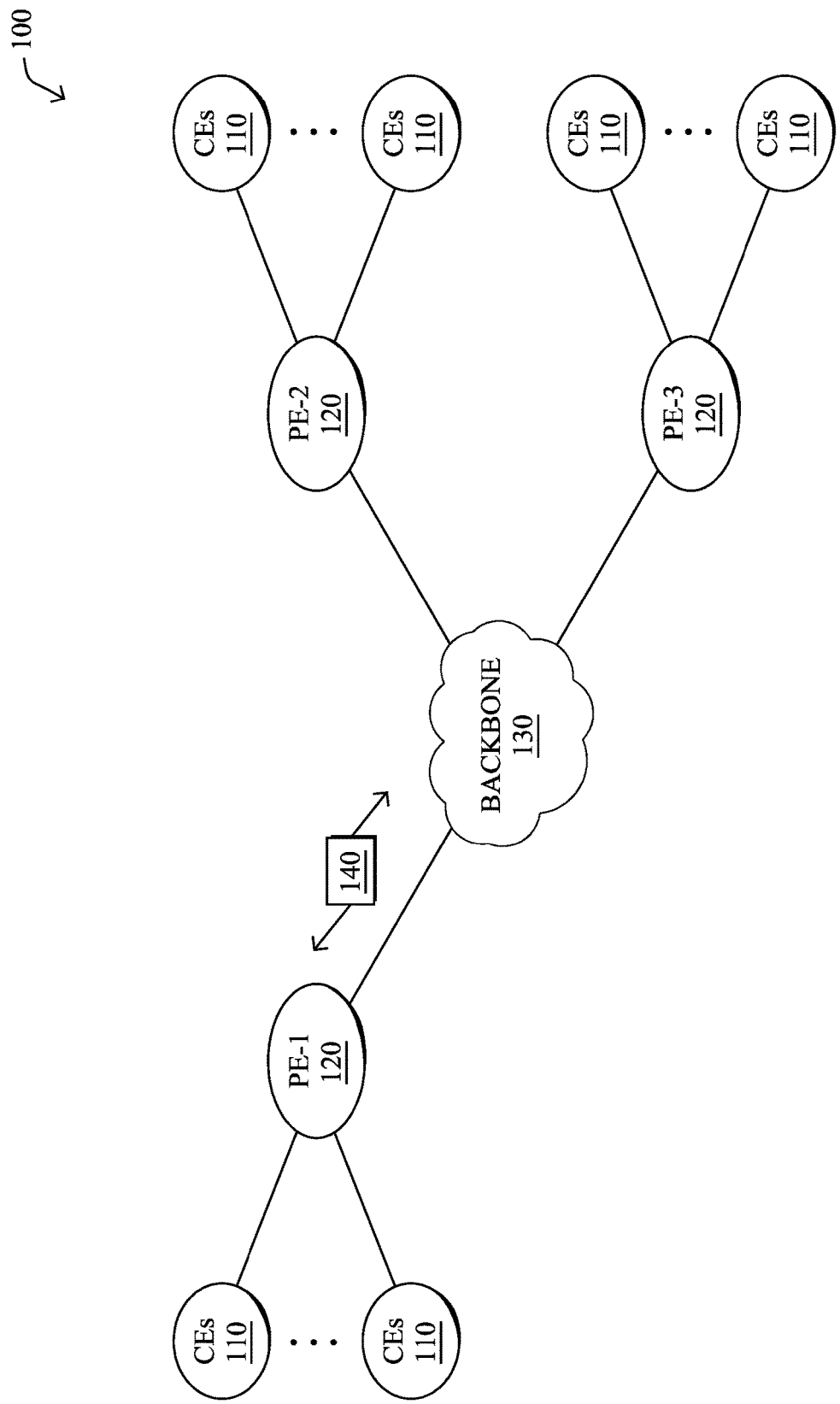
FIGS. 1A-1B illustrate an example communication network.

According to one or more embodiments of the disclosure, a device in a network maintains a plurality of machine learning-based detectors for an intrusion detection system. Each detector is associated with a different portion of a feature space of traffic characteristics assessed by the intrusion detection system. The device provides data regarding the plurality of detectors to a user interface. The device receives an adjustment instruction from the user interface based on the data provided to the user interface regarding the plurality of detectors. The device adjusts the portions of the feature space associated with the plurality of detectors based on the adjustment instruction received from the user interface.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
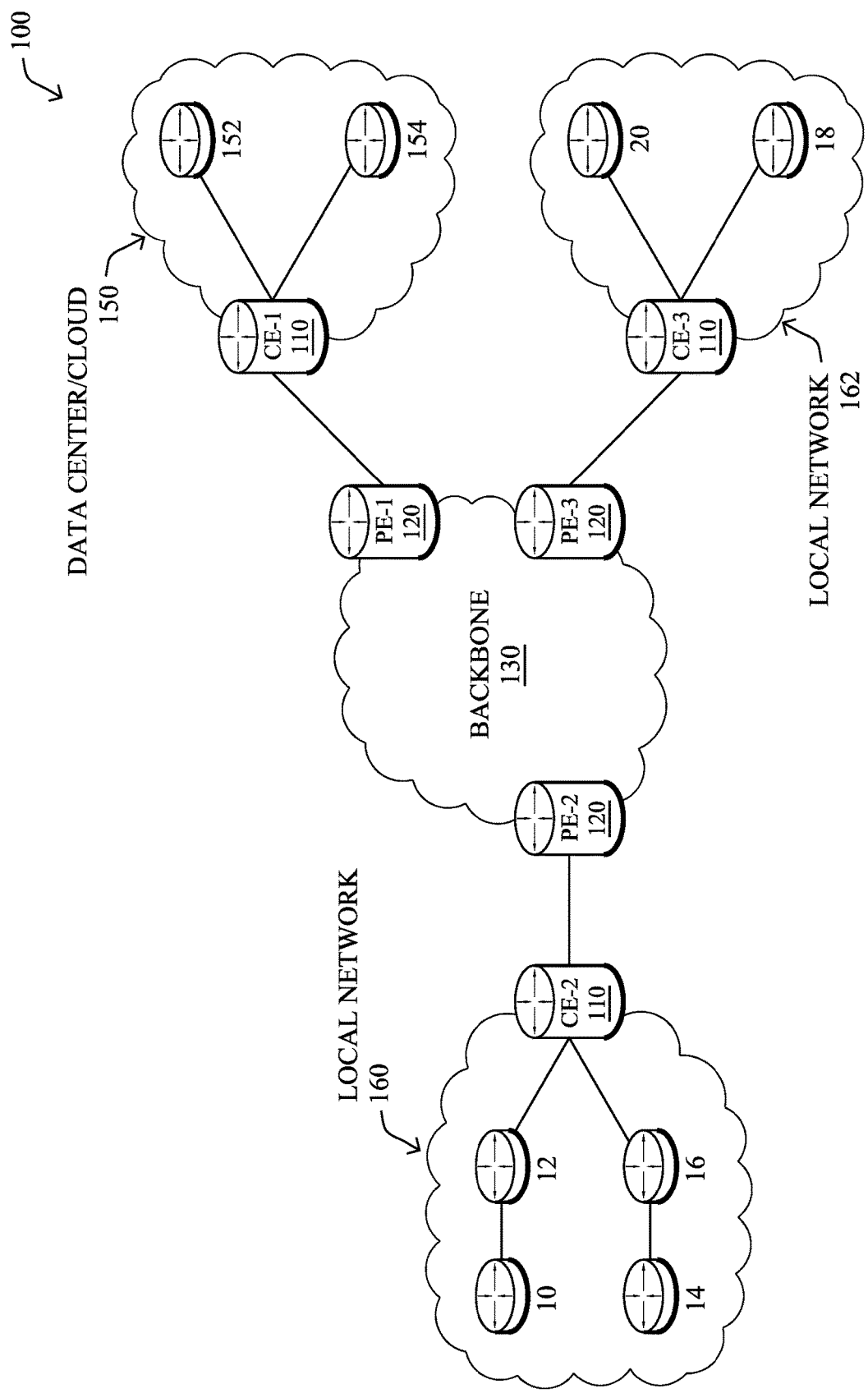

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
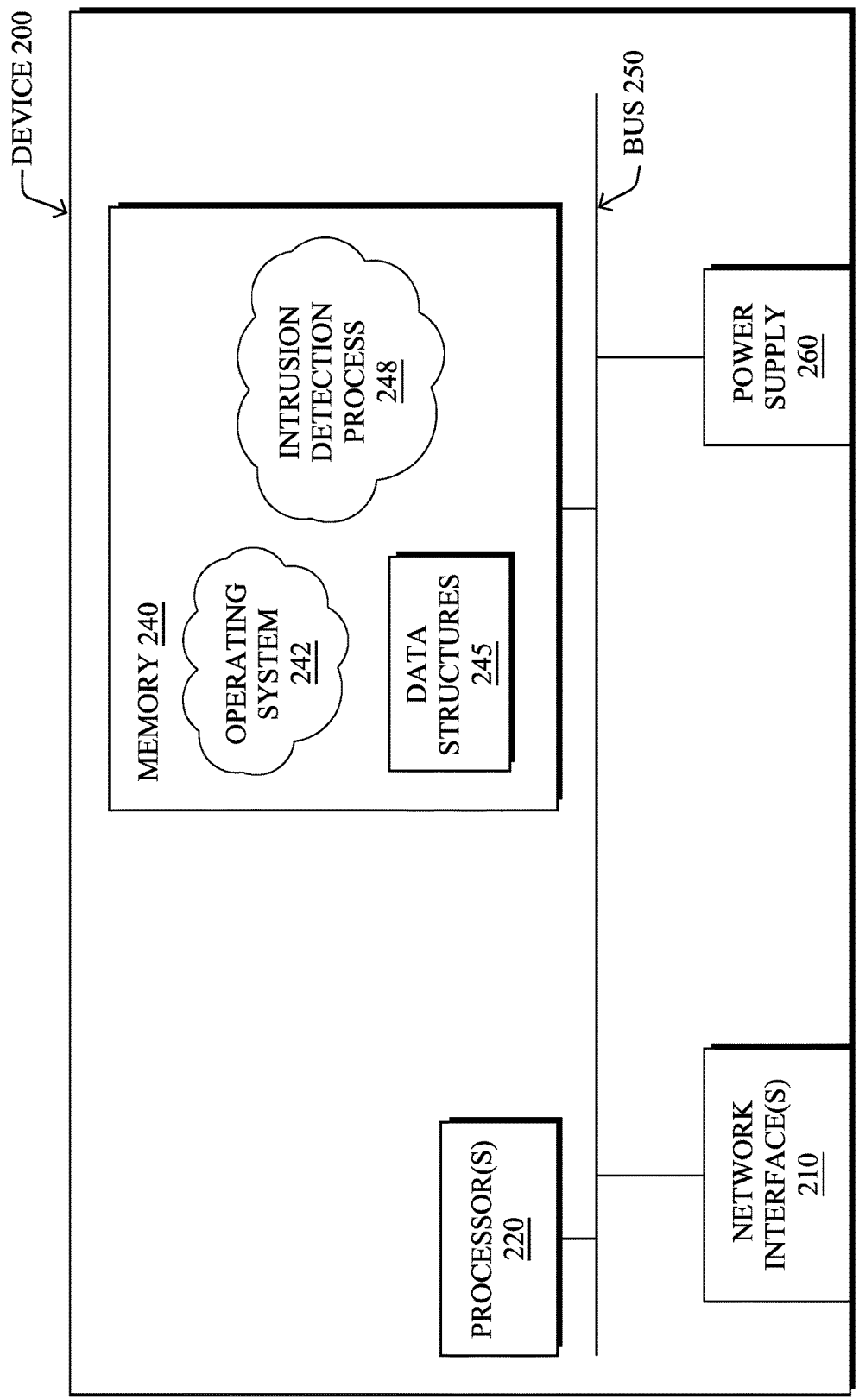
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an intrusion detection process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, intrusion detection process 248 may execute one or more machine learning-based classifiers to classify observed traffic in the network (and its originating application) for any number of purposes. In one embodiment, intrusion detection process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, intrusion detection process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like. Beyond traffic patterns, intrusion detection process 248 may further assess binaries communicated through the network, to determine whether any of the binaries are malicious.

Intrusion detection process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, intrusion detection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that intrusion detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, intrusion detection process 248 may assess the captured telemetry data on a per-flow basis. In other embodiments, intrusion detection process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, IDSs and other anti-malware systems are increasingly moving towards approaches that use external synchronization, to quickly adapt to new and previously unseen threats. However, certain industries such as critical infrastructure, government, military, and other industries that operate isolated networks, may be unable to adopt these approaches. Instead, these industries typically use internal teams of security experts that have specialized knowledge of the private network.

Private-Learned IDS

The techniques herein introduce a machine learning-based IDS that can be operated by non-specialists in a fully private setting with no connection to the outside world and without need for external signature updates. Once deployed, the system is able to improve its detection capabilities by learning/generalizing from single examples of threats provided by administrators. This learning process may be fully under the control of the administrator, triggering only on similar cases as those in the provided examples and still avoiding false positives based on benign examples. In some aspects, the administrator can adjust the detection capabilities of the system at any time, such as by retracting a given example, adjusting the tradeoff between the extent of example generalization and precision, etc. In more advanced settings, the administrator can improve the system by extending the numerical representation of incoming data by features defined specifically for the respective private setting. Such a system never needs to communicate with the outside world, allowing the operator to easily correct security decisions by providing more examples of true positives and/or true negatives.

Specifically, according to one or more embodiments of the disclosure as described in detail below, a device in a network maintains a plurality of machine learning-based detectors for an intrusion detection system. Each detector is associated with a different portion of a feature space of traffic characteristics assessed by the intrusion detection system. The device provides data regarding the plurality of detectors to a user interface. The device receives an adjustment instruction from the user interface based on the data provided to the user interface regarding the plurality of detectors. The device adjusts the portions of the feature space associated with the plurality of detectors based on the adjustment instruction received from the user interface.

Illustratively, the techniques described herein may be performed by hardware, software, and/or firmware, such as in accordance with the intrusion detection process 248, which may include computer executable instructions executed by the processor 220 (or independent processor of interfaces 210) to perform functions relating to the techniques described herein.

Operationally, the private-learned IDS may be implemented using pre-deployment and post-deployment phases as follows:

Pre-deployment:
The IDS provider may receive examples from the entity that is to deploy the IDS to its private network, to help distinguish: 1.) between malicious and benign binaries, and 2.) between malicious communications and benign communications.

The IDS provider may also define the features definition of features for analysis by the intrusion detector. This may entail, for example, a data transformation from the input data format into a numerical vector format for use by the intrusion detector. Such features may include, for example, 1.) pre-specified features describing binary content like sys-call sequences, header contents, significant instruction sequences etc., and/or 2.) pre-specified traffic features describing the structure of a target URL, transferred bytes, referrer information, target domain estimated stats including popularity, etc.

Optionally, the IDS may also be trained using the best generic ground truth available.

Post-deployment:
Once deployed to the private network, the IDS may be continuous re-learning/updated based on operator feedback performed completely internal to the private network and without the need to leverage the involvement of external experts.

The IDS may include a user interface for purposes of verification, monitoring, and/or fine-tuning the system.

Optionally, new features can also be defined as needed, in case the default feature set proves insufficient for expected efficacy.

According to various embodiments, the IDS can be implemented as a collection of instances of a targeted detector trained from a single positive or negative example (e.g., an example of a benign binary or traffic, an example of a malicious binary or traffic). More specifically, each detector instance may cover an area in the feature space reasonably close to the source example. Thus, each detector can be viewed as a generalization of a signature, capable of triggering on any event in future that resembles the training example closely enough (e.g., according to the control parameters of that detector).

Typically, the constructed IDS will include instances of both positive and negative detectors, i.e., those trained to recognize threats, as well as those trained to recognize benign or allowed behaviors. The latter acts as a corrective measure, in cases where a benign network activity behaves similarly to a malicious behavior. As each detector covers part of the feature space, the efficacy of the IDS will also increase with the number of detector instances in the space, thereby allowing for better coverage.

As a naïve approach to detector training, all possible data from the network can be used to retrain the system in place using machine learning techniques such as random forests, neural networks, and the like. However, this approach does not scale well because all background data (or a huge sample of it) would have to be maintained. This is approach would also require a large number of positive samples to be manually labeled and added to the ground truth, to achieve reasonable accuracy of the trained system. Moreover, the training process with standard machine learning techniques would be prone to malfunction, if not under supervision of a machine learning expert (e.g., due to over-training and other effects).

In further embodiments, the training may entail learning rules for detecting novel threats from only one or a few known malicious samples with no special expert knowledge needed. When updating the system to cover new positive samples, or to improve efficacy on known samples, the system does not need to keep background samples or a collection of all previously discovered malicious samples. Consequently, the system has much lower memory requirements. Adding a positive or negative sample to the engine knowledge base is realized through learning a new detector using a two-phase approach, as detailed below.

In the first phase of the detector training, which is computationally expensive but needs to be executed just once, a mean vector ($m_b$) and covariance matrix ($C_b$) are calculated using unlabeled/background samples from observed network data. This vector and matrix captures what the normal data should look like, since it is assumed that the rate with which the malware is present in the normal data is small and its presence has negligible impact on the estimation of mean and covariance.

In the second phase, once a security administrator identifies samples of a new type of malware and wants to create a corresponding detector, the system may extract the mean ($m_m$) from the sample and find a direction (w) which bests separates the mean of the identified malware sample(s) from that of normal behavior within the feature space. This direction is calculated as follows:

$$w = C_b^{-1}(m_m - m_b)$$

where $C_b$ denotes the covariance matrix on background calculated in the first step, $m_b$ denotes the mean vector on background calculated in the first step, $m_m$ denotes the mean vector calculated from few malware samples.

Although the above formula resembles the standard Fisher Linear Discriminant (FLD), the key difference is that the proposed computation uses only a covariance matrix on the background data, whereas FLD also uses a covariance matrix of malware samples. Since it is unlikely for there to be enough malware samples available from the private network to estimate the covariance matrix from the samples, it is better in most circumstances to avoid its use. Note that the above formula is also very fast to compute, which means that it is possible to create on-demand detector for a specific kind of malware within a few minutes after it has been discovered.

Figure 3:
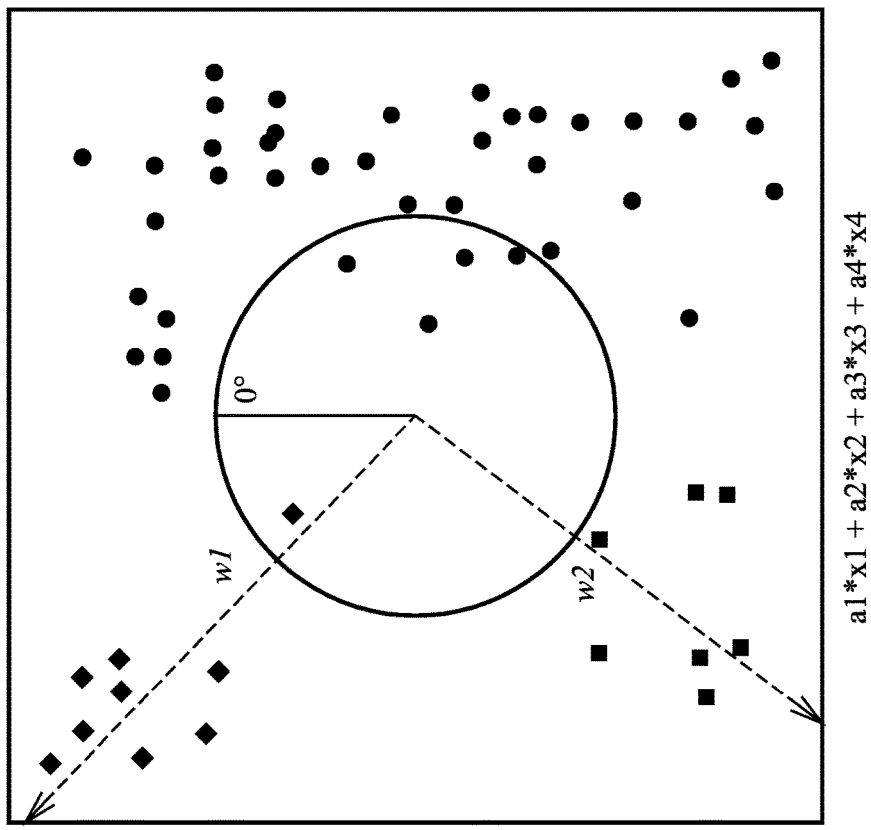
FIG. 3 illustrates an example plot of projections for different malware groups.

FIG. 3 illustrates an example plot 300 of learned projections for different malware groups using the techniques herein. Assume, for example, that samples 302 exist for a first type of malware, samples 304 exist for a second type of malware, and that samples 306 of background observations are also available from the network. In such a case, the system may calculate $w_1$ and $w_2$ that represent the directions from the mean of the sample under analysis (e.g., the center of plot 300) to those of the two malwares.

In terms of detection, for each sample x under investigation, the IDS may find the detector having the closest associated direction. For example, the IDS may determine the closest direction by calculating the cosine distance of sample x to all projection vectors w in a set of all detectors. As each detector will have a class label, the IDS will know not only whether the sample x is malicious or legitimate, but the detector can also provide a distance (or other measure of similarity) to other malware classes.

In various embodiments, a given detector in the feature space may be adjusted by controlling any number of parameters for the detector. For example, the IDS may provide data regarding the detector to a user interface and, in turn, receive adjustment commands from the operator, to adjust the operation of a given detector within the feature space. For example, a first parameter a may control the distance from the origin at which the detector should start to trigger. Because the anomaly score returned by this method is normalized by design, a may be set by default to a=1 and does not need to be adjusted initially. However, during use, this parameters may be used to reduce false positives when the background is really noisy.

Another example detector parameter b may control the width of the "cone" of the detector (e.g., the shape of the region of the feature space covered by the detector). Typically, the broader this region, the higher recall of the detector, but at the risk of lowered precision. So, by simply adjusting this one parameter, the user can easily change the behavior of a specific detector or even a group of detectors.

In various embodiments, the user interface of the IDS may also allow the user to whitelist certain behaviors. For example, when an administrator or other user finds out that some domain d within the feature space is in fact a false positive, and adjusting the parameters of the offending detector does not resolve the issue, the administrator may use the interface to whitelist the domain. As would be appreciated, whitelisting the domain d actually entails whitelisting a set of behaviors.

To whitelist a domain/region d of the feature space, the IDS may train a new detector for domain d using the same approach as for a malware sample, but set the detector label to legitimate/benign. Therefore, not only is this one domain removed from further detections by the IDS, but all others with similar behavior are removed as well. Typically, it is recommended that a smaller parameter b be set for a whitelisting detector, to make the detector highly specific and not decrease the overall recall.

FIGS. 4A-4E illustrate examples of the adjustment of detector parameters in a feature space, according to various embodiments. More specifically, FIGS. 4A-4E illustrate plots of a dataset that was artificially created and assessed using a prototype of the above techniques. As would be appreciated, the examples in FIG. 4A-4E are shown in two dimensions for purposes of illustration. However, a typical feature space may be of higher dimensionality.

Figure 4A:
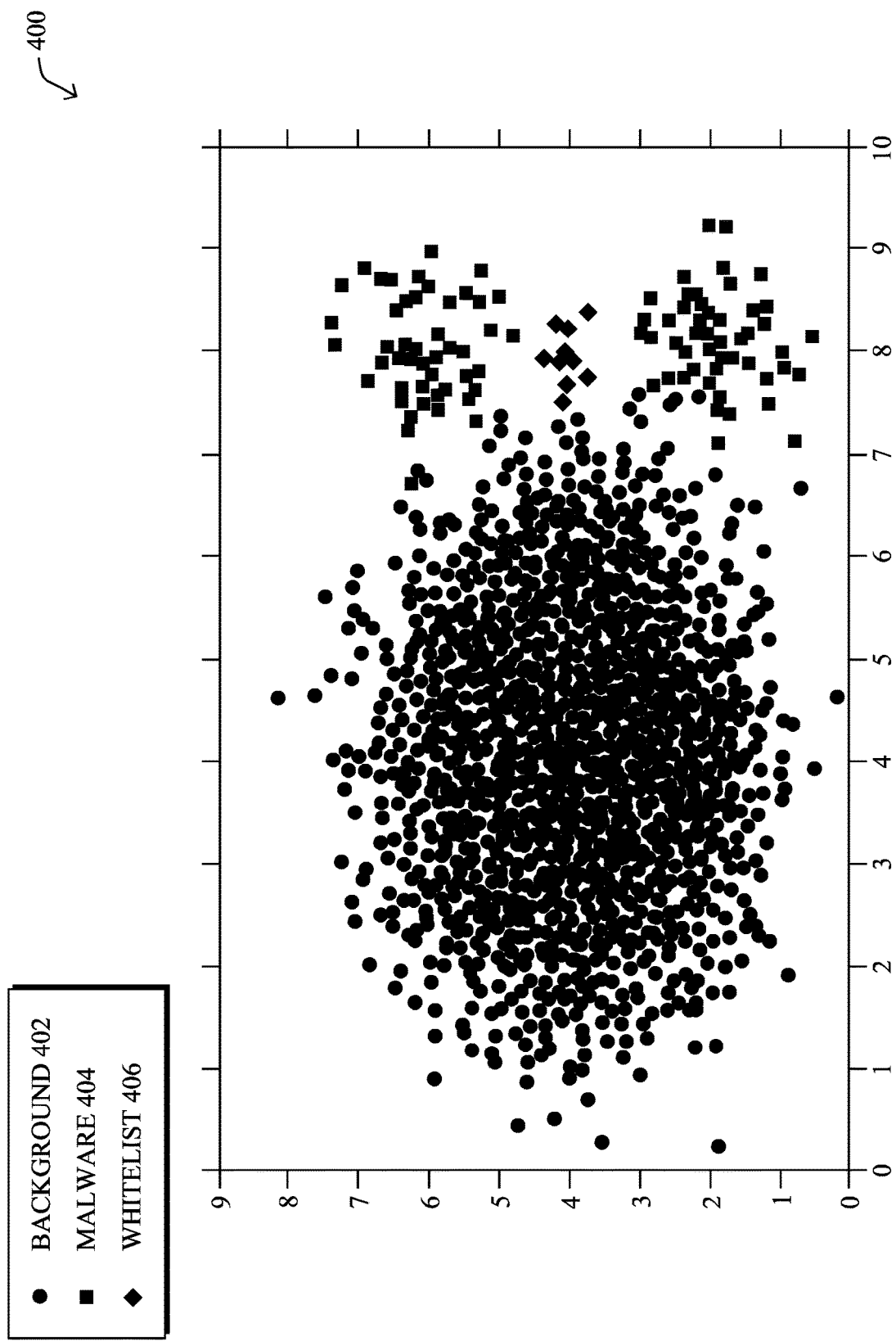
FIGS. 4A-4E illustrate examples of the adjustment of detector parameters in a feature space.

As shown in FIG. 4A, consider the case in which background samples 402, malware samples 404, and benign samples 406 to be whitelisted all exist within features space 400. During IDS operation, triggering of a detector by a background sample 402 would represent a false positive. Similarly, triggering by malware samples 404 would represent a true positive. Finally, samples 406 represent samples that may trigger the detector as false positives and should be whitelisted.

Figure 4B:
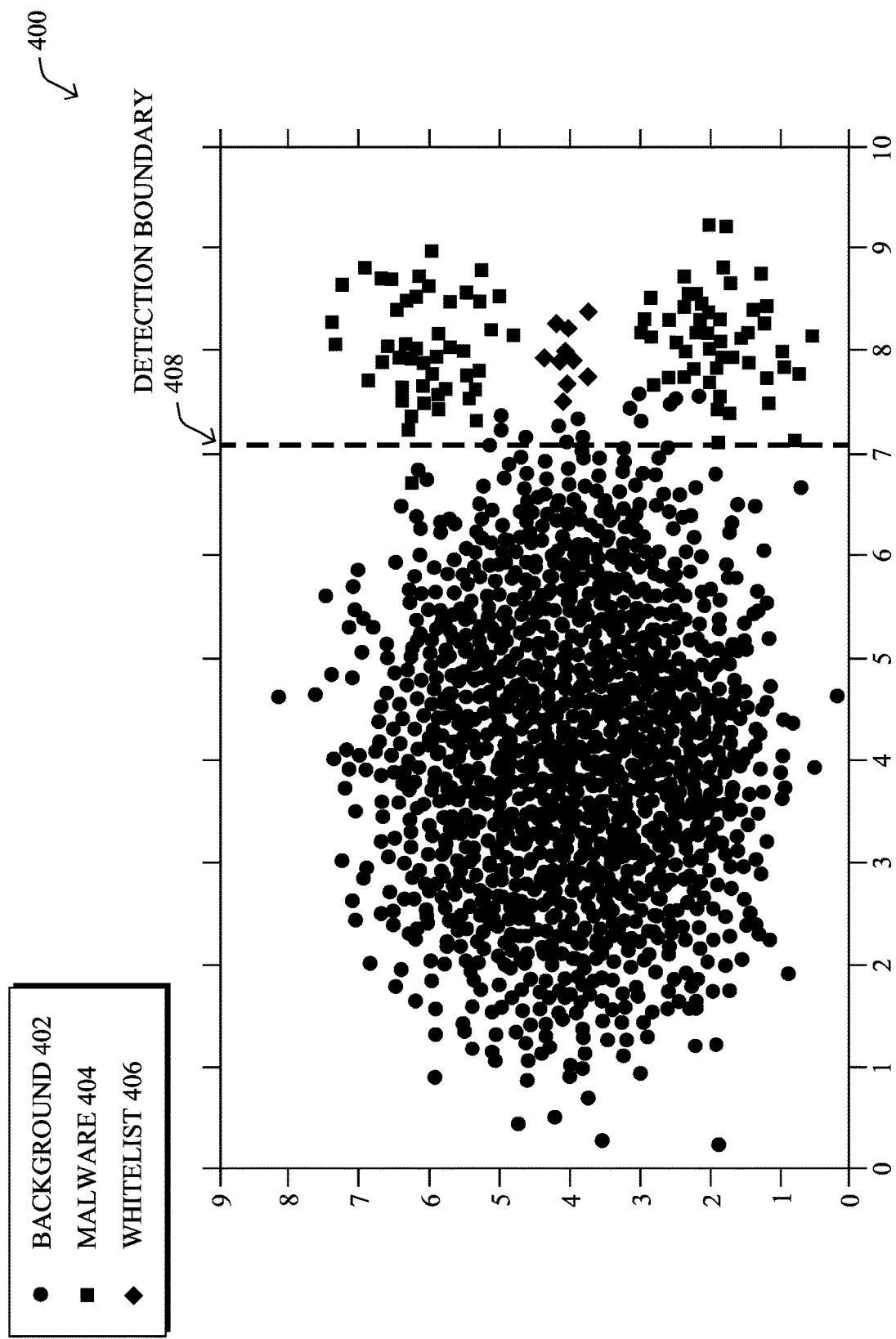

FIG. 4B illustrates an example in which the detection boundary 408 is set to represent all positives as one class. In other words, samples 406 may be lumped together with samples 404 for purposes of detection. However, this may lead to false positives, if any of samples 406 or similar samples are assessed.

Figure 4C:
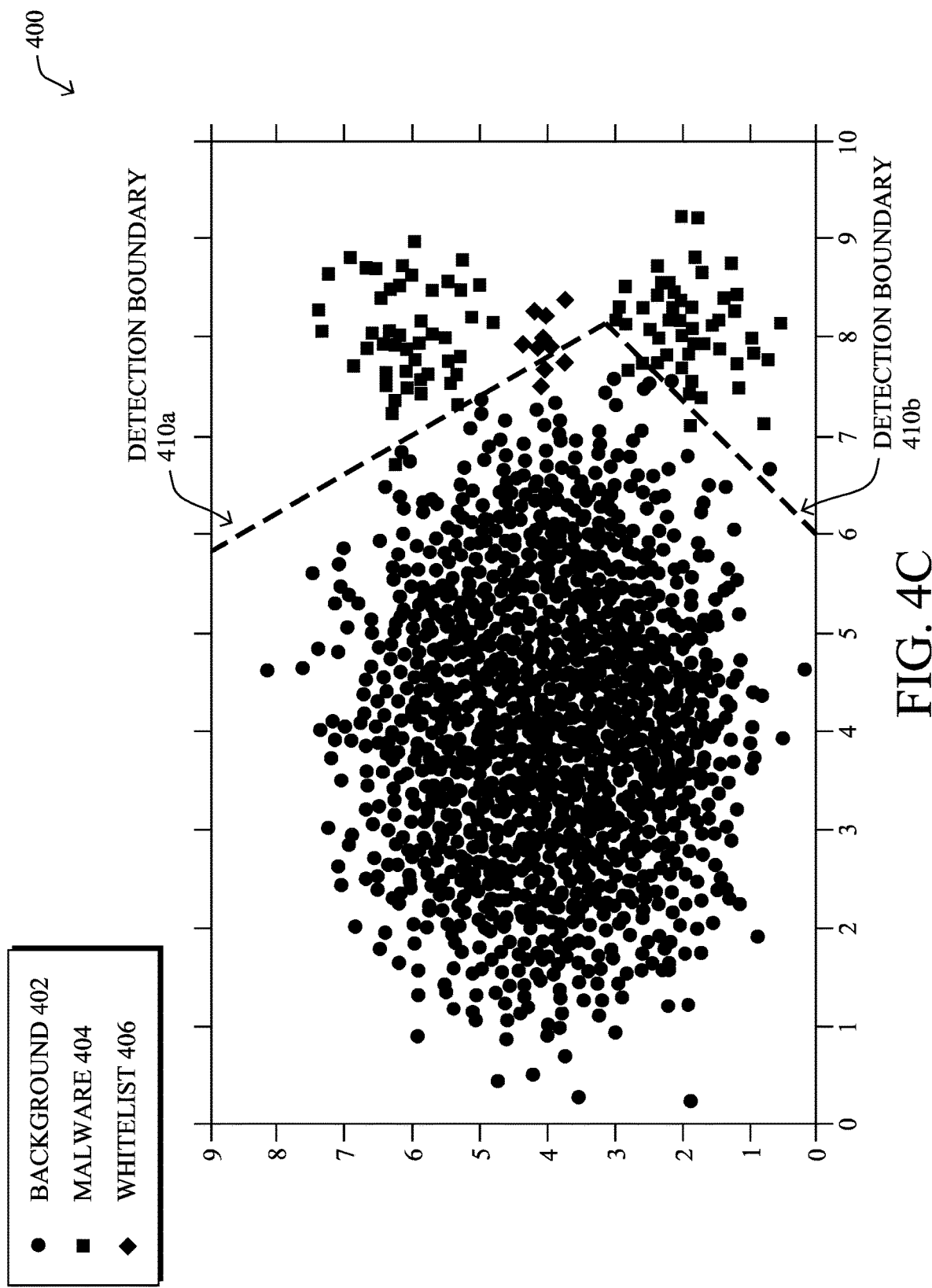

In FIG. 4C, the positives can also be presented as two different classes by defining detection boundaries 410a-410b. In doing so, much of the feature space 400 occupied by samples 406 may instead be treated similar to that of background samples 402. However, as shown, there are still a number of samples 406 that fall outside of this region and, thus, are still susceptible to false positives.

Figure 4D:
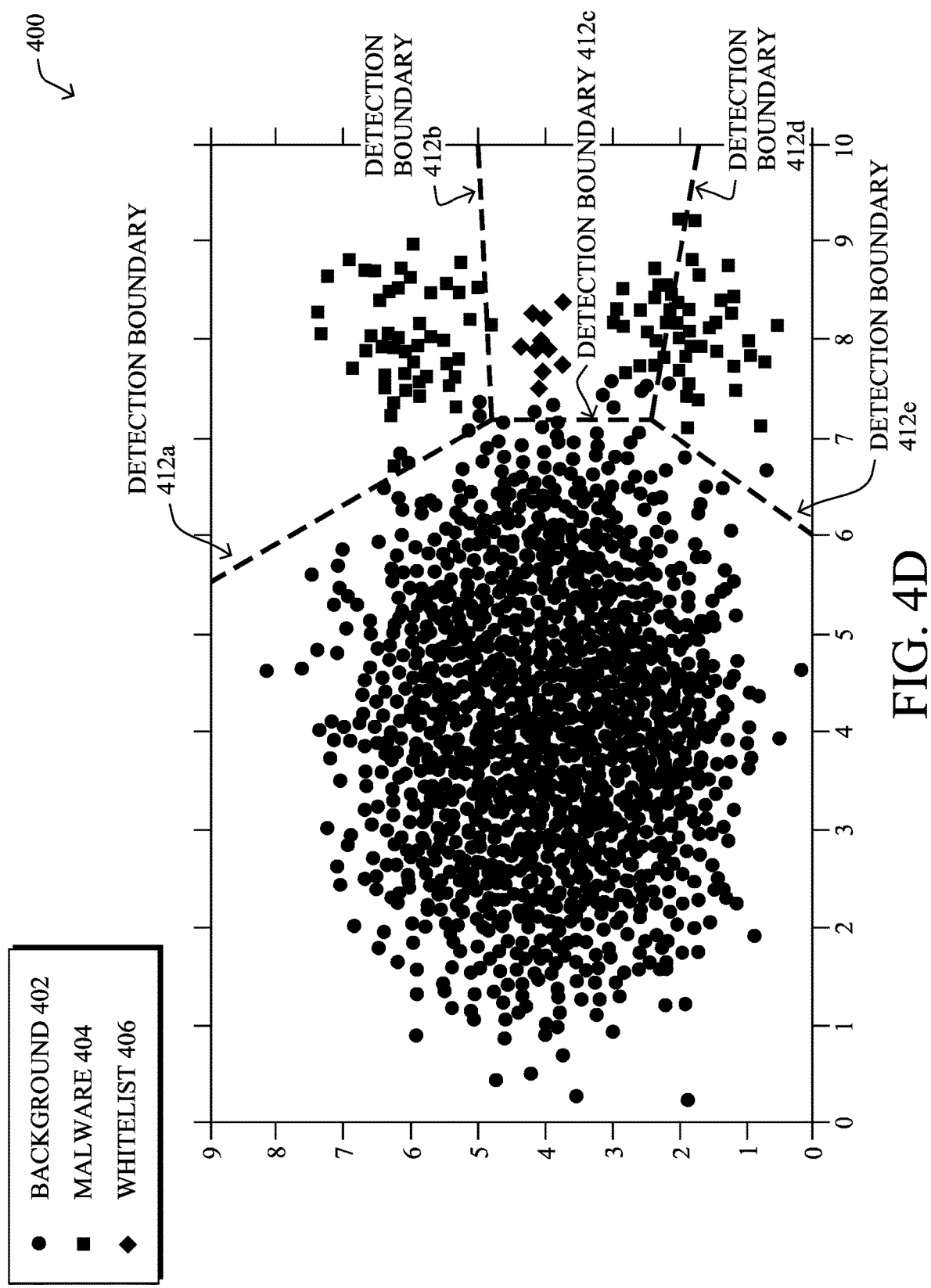

In FIG. 4D, in various embodiments, samples 406 may be used to train a new detector for the IDS that whitelists their corresponding behaviors. In doing so, the coverages of the three detectors (e.g., benign/background, malicious, and whitelisting) may be separated by the detection boundaries 412a-412e shown. Notably, the whitelisting detector may carve out a region of feature space 400 defined by boundaries 412b-412d. Any sample that falls within this region can then be determined by the IDS as representing a whitelisted behavior.

Figure 4E:
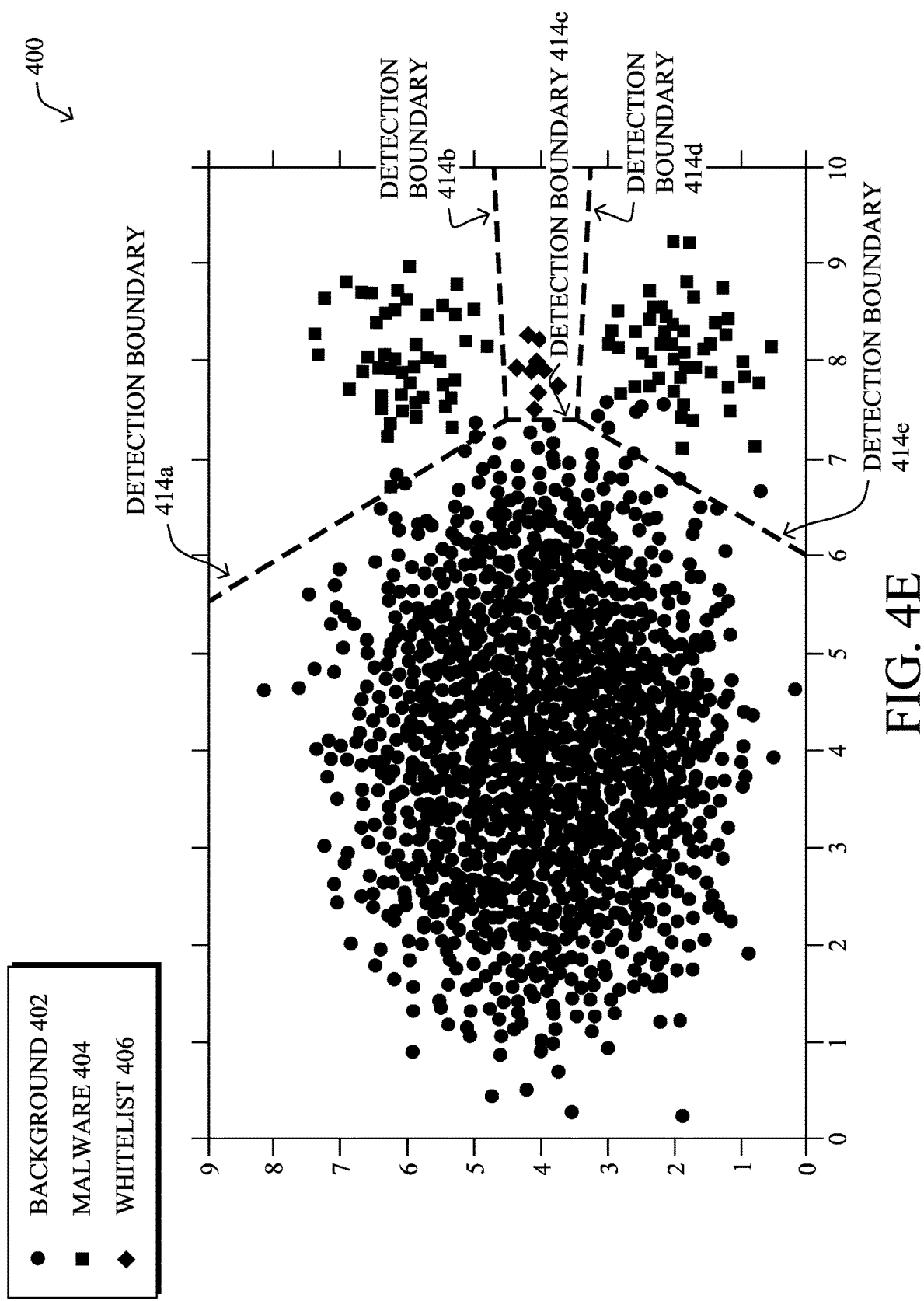

As noted above, the control parameters of an individual detector can also be controlled, to adjust the region of the feature space 400 that is covered by the detector. For example, as shown in FIG. 4E, the parameters a and b described above can be adjusted (e.g., via the user interface), to adjust the shape of the region covered by the whitelisting detector, to make the detector even more specific to samples 406 than that shown in FIG. 4D.

Generally, the techniques herein prescribe the use of multiple, individual detectors to cover different regions of a features space assessed by the IDS. Different approaches may be taken to combine detectors within the feature space, according to various embodiments, as shown in FIGS. 5A-5D.

Figure 5A:
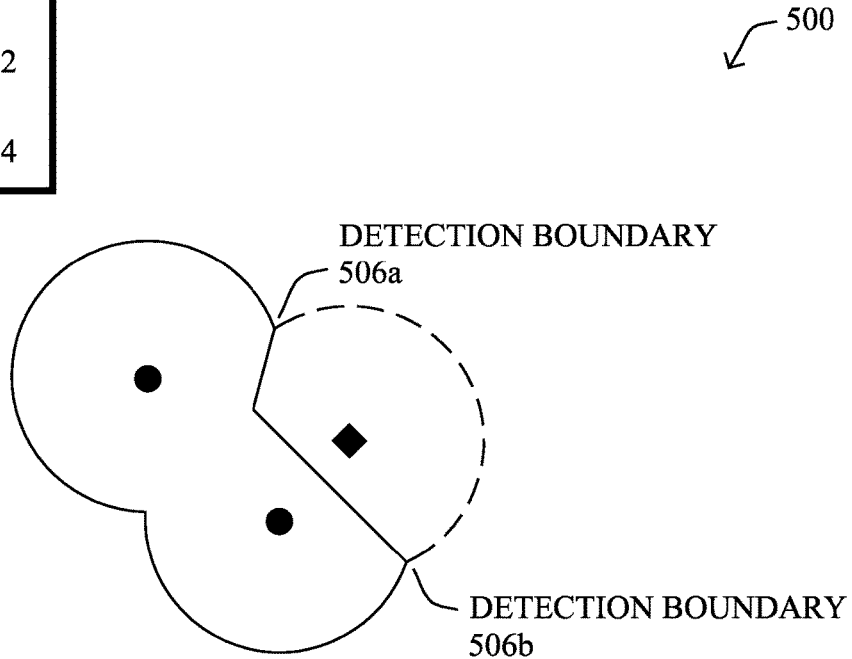
FIGS. 5A-5D illustrate various approaches to merging individual detectors.

In FIG. 5A, assume that a whitelisting detector 504 is added to the feature space 500 and that the region of feature space 500 covered by whitelist detector 504 impinges on the regions covered by positive detectors 502. In a default scheme, similar to Voronoi partitioning, the IDS may simply "cut" the coverage of the positive detectors 502, thereby defining detection boundaries 506a-506b between whitelist detector 504 and the regions covered by detectors 502.

Figure 5B:
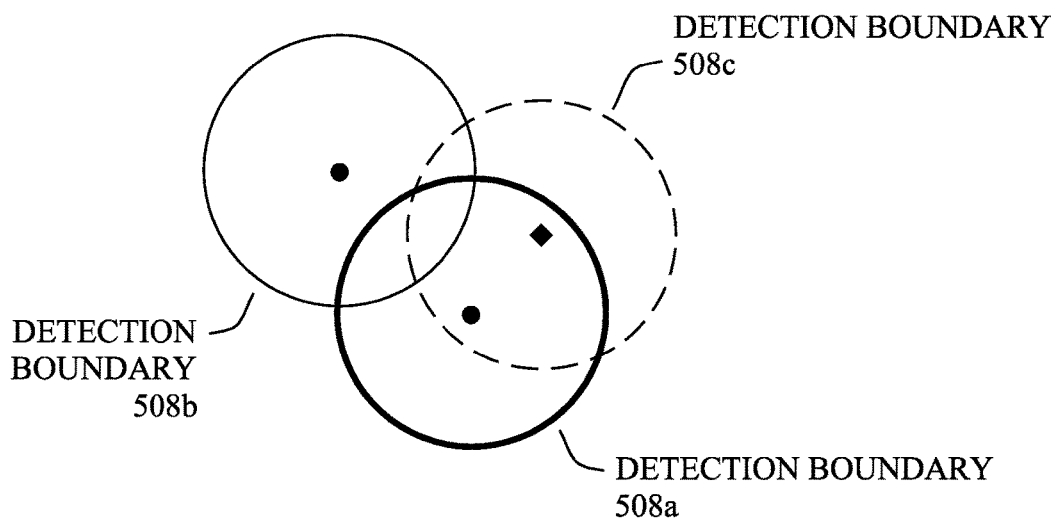

In FIG. 5B, another potential combination approach would be to simply give priority to a given detector based on the order in which the detectors are added to the IDS. For example, assume that the first positive detector 502 is defined with detection boundary 508a, followed by the second positive detector 502 with detection boundary 508b. In such a case, the analysis of the second positive detector 502 of samples within detection boundary 508b may take priority over any analysis by the first detector in the overlapping regions of the detectors. When whitelist detector 504 is subsequently added to the IDS, its detection boundary 508c may then give whitelist detector 504 priority over both of the positive detectors 502 in their overlapping regions.

Figure 5C:
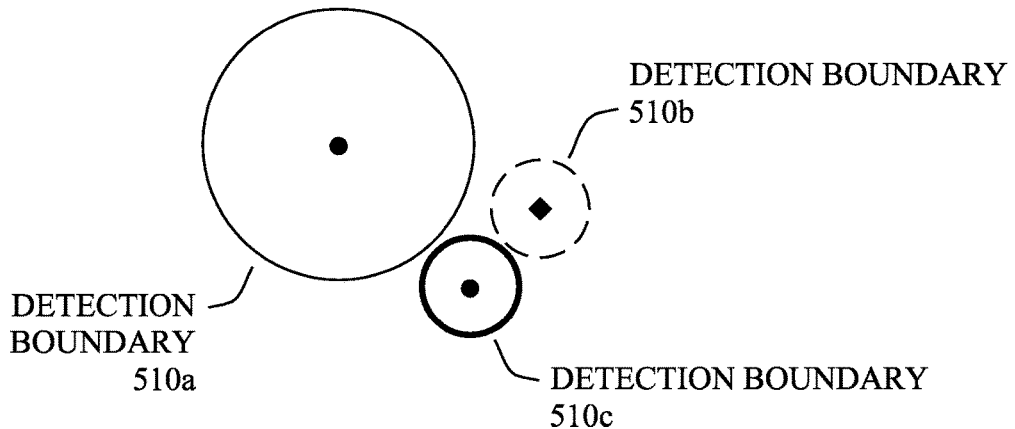

FIG. 5C illustrates yet another potential approach to combining detectors 502-504 whereby overlapping coverage in the feature space 500 is removed. Notably, the parameters of the individual detectors may be adjusted such that the corresponding detection boundaries 510a-510c do not overlap at all. Thus, no prioritization is needed, since each detector 502-504 has its own unique region of feature space 500.

Figure 5D:
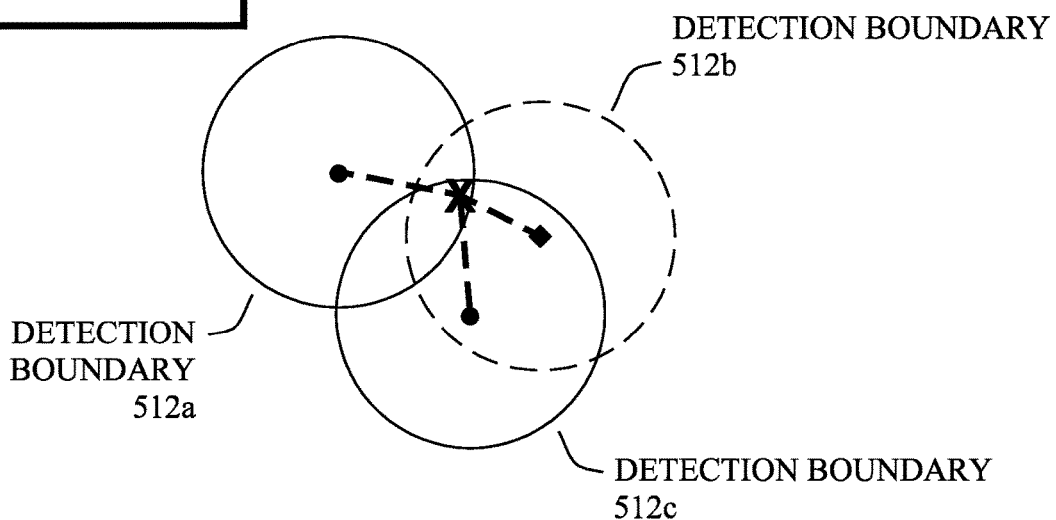

FIG. 5D illustrates a fourth potential approach to combining detectors 502-504, in further embodiments. As shown in FIG. 5D, assume that detectors 502-504 are allowed to have overlapping regions within feature space 500, similar to the case illustrated in FIG. 5B. However, rather than simply prioritize the detectors based on the order in which they were added to the IDS, the IDS may instead base the prioritization on the distances between the individual detectors 502-504 to a given sample 514 under analysis. For example, if sample 514 happens to be closest to detector 504, the IDS may whitelist sample 514, even though it also appears in feature space 500 covered by both of positive detectors 502.

With respect to system verification and maintenance, the simplest approach would be to leverage a validation set of background samples and already known positives. In such a case, these samples could be presented to a user interface of the IDS, thereby allowing the administrator or other user to adjust the parameters of the various detectors of the system and review the effects of this adjustment on detector precision and recall. Even samples from the external source of threat intelligence can be presented to such a user interface, to test how well the IDS is prepared for this particular type of threat. Furthermore, the IDS may be configured to show a user that the currently used features are not descriptive enough to discover a new type of threat and that additional features should be monitored by the system.

As noted, the user interface of the IDS may also be configured to allow a user/administrator to disable detectors (e.g., underperforming detectors, etc.), adjust detector parameters, re-enable archived detectors, and/or train new detectors (e.g., a new whitelist detector, a new positive or background detector, etc.). Naturally, maintaining a private-learned IDS will be susceptible to learning the experience bias of such a user. However, the IDS can counter these effects by keeping a pre-deployment validation ground truth against which any re-learning can be tested, automatically.

Various possible use cases are contemplated herein, in accordance with the various embodiments. In a very basic setup, the IDS may create all detectors with the detectors parameters remaining invisible to the users. In turn, users can simply adjust the system detectors by adding or removing positive or negative samples/examples and without the ability to adjust the detector parameters. In another possible use case, the IDS may allow the user to adjust the sensitivity of individual detectors to their respective sample types. This gives the users the ability to affect the precision vs. recall tradeoff.

In yet another case, the IDS may allow users to define new numeric features of their own. The system would then allow feature extraction code to be plugged into the core intrusion detection engine, allowing the users to better exploit discriminative information in the input data. This can be advantageous for boosting efficacy as the optimal feature extraction may not have been known at deployment time, as well as for even stricter privacy. The IDS provider would thus not need to be given access to the structure of input data, thereby maintaining the privacy of the entity associated with the private or isolated network.

In a further case, the IDS may operate in a manner similar to above, but with the additional functionality of automated batch creation or adjustment of detectors based on external/offline information sources (e.g., blacklists, etc.). If privacy demands can be eased, it is possible to balance the privacy vs. external intel tradeoff by allowing, e.g., low-frequency updates of default ground-truth from the IDS provider, etc.

Figure 6:
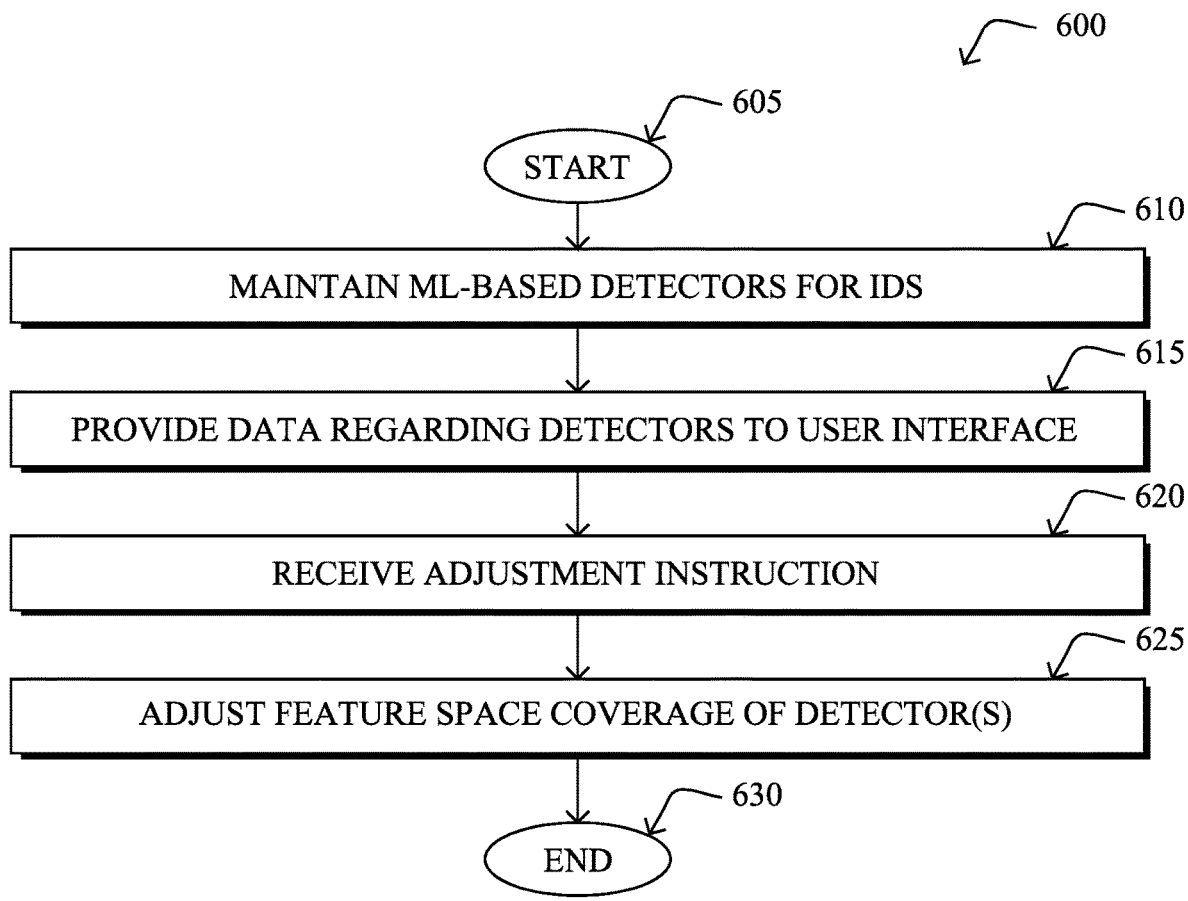
FIG. 6 illustrates an example simplified procedure for implementing a private-learned intrusion detection system (IDS).

FIG. 6 illustrates an example simplified procedure for implementing a private-learned intrusion detection system (IDS) in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may maintain a plurality of machine learning-based detectors for the IDS with each detector being associated with a different portion of a feature space of traffic characteristics assessed by the intrusion detection system. In some cases, as noted above, the portions of the feature space may overlap. In other cases, the portions may be set such that there is no overlap between detectors in the feature space.

At step 615, as detailed above, the device may provide data regarding the detectors to a user interface. In one embodiment, the data regarding the detectors may include information regarding the analysis of samples from the network by the detectors. For example, if a certain traffic sample was flagged by one of the detectors as being indicative of malware, the device may provide an indication of this detection to the user interface. In further embodiments, the data regarding the detectors may include one or more detector parameters that control the portions of the feature space attributed to the individual detectors. For example, the parameters may control the range or boundaries for a particular detector within the feature space. Other data regarding the detectors may include information regarding the detector types, such as whether a given detector is a positive detector, a background detector, or a whitelist detector.

At step 620, the device may receive an adjustment instruction from the user interface based on the data provided to the user interface regarding the plurality of detectors, as described in greater detail above. In some embodiments, the adjustment instruction may correspond to an instruction to disable a particular one of the detectors or a set of detectors. In a further embodiment, the adjustment instruction may correspond to an instruction to add a new detector (e.g., using a sample/example set of data). For example, the instruction may instruct the device to add a whitelist detector to cover a certain portion of the feature space. In yet another embodiment, the adjustment instruction may include one or more adjustments to an existing detector, such as an adjustment to one or more detector parameters that control the portion of the feature space associated with a given detector (e.g., by adjusting the range and detection boundaries of the detector in the feature space).

At step 625, as detailed above, the device may adjust the portions of the features space associated with the detectors based on the adjustment instruction received from the user interface. For example, if a given detector is deactivated, its feature space coverage may be allocated to one or more of the other detectors. In another example, if the detector parameters for a given detector are changed, the range and detection boundaries for the detector may be adjusted, accordingly. In another example, if a new detector is added, the portions of the feature space associated with its neighboring detectors may also be adjusted, such as by giving priority to the new detector, adjusting the detection boundaries of the neighboring detectors, etc. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a private-learned IDS that does not require any external updates or a team of in-house specialist to create signatures or perform complex re-training. In addition, the system is able to orchestrate multiple detectors to cover not only a single threat, but a threat landscape, using both positive and negative/background detectors. The negative detectors may function to implement "generalized whitelisting" and more targeted whitelisting detectors may also be added, as well. The combination of both positive and negative detectors allows for the build-up of threat landscape coverage, with the tradeoff between false positives and false negatives being optimized based on user feedback.

As the proposed system is limited by learning specifically and only from a relatively small number of shown examples, it can be expected to differ from the full-blown, machine learning-based system. Notably, by not using the strongest learning techniques, such as deep learning, its generalization capability would be more limited, but still stronger than a purely signature-based system. However, by not using the strongest learning techniques, the proposed system is also more robust and less breakable during maintenance, allowing it to be supported by less skilled users and without a team of machine learning specialists.

While there have been shown and described illustrative embodiments that provide for a private-learned IDS, it is to be understood that various other adaptations and modifications may be made within the spirit and scope of the embodiments herein. For example, while certain embodiments are described herein with respect to using certain models for purposes of intrusion detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device in a network, a plurality of machine learning-based detectors for an intrusion detection system, wherein each detector analyzes for intrusions a different portion of a feature space of traffic characteristics assessed by the intrusion detection system, and wherein each portion of the feature space is separated from an adjacent portion of the feature space by one or more detection boundaries;
   providing, by the device, data regarding the plurality of detectors to a user interface;
   receiving, at the device, an adjustment instruction from the user interface based on the data provided to the user interface regarding the plurality of detectors; and
   adjusting, by the device, the portions of the feature space associated with the plurality of detectors by modifying the one or more detection boundaries based on the adjustment instruction received from the user interface,
   wherein receiving the adjustment instruction from the user interface comprises:
      receiving, at the device, a first parameter for a particular one of the detectors that controls a distance from a point in the features space associated with the particular detector, wherein the distance in the feature space controls a range of the traffic characteristics in the feature space that trigger the particular detector; and
      receiving, at the device, a second parameter for the particular detector that controls a tradeoff between recall and precision of the particular detector by controlling a bound for the portion of the features space associated with the particular detector.

2. The method as in claim 1, further comprising:
   receiving, at the device, traffic characteristic data regarding traffic observed in the network;
   identifying, by the device, a particular one of the plurality of detectors that is associated with the portion of the feature space that corresponds to the received traffic characteristic data; and
   using, by the device, the particular detector to determine whether the traffic characteristic data is indicative of malware being present in the network.

3. The method as in claim 1, further comprising:
generating, by the device, a new detector for the intrusion detection system based on a sample of traffic characteristics from the network by:
determining, by the device, a mean of the sample as a point in the feature space;
calculating, by the device, a direction in the feature space relative to the point in the feature space that points towards a region of the feature space associated with unlabeled background traffic characteristics observed in the network.

4. The method as in claim 3, wherein generating the new detector comprises:
calculating a distance from the point in the feature space to the region of the feature space associated with the unlabeled background traffic characteristics as a covariance between the mean of the sample and a mean of the unlabeled background traffic characteristics observed in the network.

5. The method as in claim 1, wherein adjusting the portions of the feature space associated with the plurality of detectors based on the adjustment instruction received from the user interface comprises:
training, by the device, a new detector for the feature space that whitelists traffic behaviors represented by the portion of the feature space associated with the new detector.

6. The method as in claim 5, wherein the new detector reduces one or more portions of the feature space associated with one or more of the plurality of detectors.

7. The method as in claim 1, wherein the portions of the feature space associated with two or more of the detectors are overlapping, and wherein the method further comprises:
identifying, by the device, the two or more detectors based on a sample of characteristics data observed in the network falling within the overlapping portions of the feature space associated with the two or more detectors; and
determining, by the device, whether the sample is indicative of malware being present in the network by weighting results from the two or more detectors.

8. An apparatus comprising:
one or more network interfaces to communicate with a network;
a processor coupled to the network interfaces and configured to execute one or more processes; and
a memory configured to store a process executable by the processor, the process when executed configured to:
maintain a plurality of machine learning-based detectors for an intrusion detection system, wherein each detector analyzes for intrusions a different portion of a feature space of traffic characteristics assessed by the intrusion detection system, and wherein each portion of the feature space is separated from an adjacent portion of the feature space by one or more detection boundaries;
provide data regarding the plurality of detectors to a user interface;
receive an adjustment instruction from the user interface based on the data provided to the user interface regarding the plurality of detectors; and
adjust the portions of the feature space associated with the plurality of detectors by modifying the one or more detection boundaries based on the adjustment instruction received from the user interface,
wherein the apparatus receives the adjustment instruction from the user interface by:
receiving a first parameter for a particular one of the detectors that controls a distance from a point in the features space associated with the particular detector, wherein the distance in the feature space controls a range of the traffic characteristics in the feature space that trigger the particular detector; and
receiving a second parameter for the particular detector that controls a tradeoff between recall and precision of the particular detector by controlling a bound for the portion of the features space associated with the particular detector.

9. The apparatus as in claim 8, wherein the process when executed is further configured to:
receive traffic characteristic data regarding traffic observed in the network;
identify a particular one of the plurality of detectors that is associated with the portion of the feature space that corresponds to the received traffic characteristic data; and
use the particular detector to determine whether the traffic characteristic data is indicative of malware being present in the network.

10. The apparatus as in claim 8, wherein the process when executed is further configured to:
generate a new detector for the intrusion detection system based on a sample of traffic characteristics from the network by:
determining a mean of the sample as a point in the feature space;
calculate a direction in the feature space relative to the point in the feature space that points towards a region of the feature space associated with unlabeled background traffic characteristics observed in the network.

11. The apparatus as in claim 10, wherein the new detector is further generated by:
calculating a distance from the point in the feature space to the region of the feature space associated with the unlabeled background traffic characteristics as a covariance between the mean of the sample and a mean of the unlabeled background traffic characteristics observed in the network.

12. The apparatus as in claim 8, wherein the apparatus adjusts the portions of the feature space associated with the plurality of detectors based on the adjustment instruction received from the user interface by:
training a new detector for the feature space that whitelists traffic behaviors represented by the portion of the feature space associated with the new detector.

13. The apparatus as in claim 12, wherein the new detector reduces one or more portions of the feature space associated with one or more of the plurality of detectors.

14. The apparatus as in claim 8, wherein the portions of the feature space associated with two or more of the detectors are overlapping, and wherein the process when executed further comprises:
identifying the two or more detectors based on a sample of characteristics data observed in the network falling within the overlapping portions of the feature space associated with the two or more detectors; and
determining whether the sample is indicative of malware being present in the network by weighting results from the two or more detectors.

15. The apparatus as in claim 14, wherein the apparatus weights the results from the two or more detectors based on distances between points in the feature space associated with the two or more detectors and the point in the feature space associated with the sample.

16. A tangible, non-transitory, computer-readable medium having software encoded thereon, the software when executed by a device in a network configured to:
   maintaining, by the device in the network, a plurality of machine learning-based detectors for an intrusion detection system, wherein each detector analyzes for intrusions a different portion of a feature space of traffic characteristics assessed by the intrusion detection system, and wherein each portion of the feature space is separated from an adjacent portion of the feature space by one or more detection boundaries;
   providing, by the device, data regarding the plurality of detectors to a user interface;
   receiving, at the device, an adjustment instruction from the user interface based on the data provided to the user interface regarding the plurality of detectors; and
   adjusting, by the device, the portions of the feature space associated with the plurality of detectors by modifying the one or more detection boundaries based on the adjustment instruction received from the user interface, wherein receiving the adjustment instruction from the user interface comprises:
      receiving, at the device, a first parameter for a particular one of the detectors that controls a distance from a point in the features space associated with the particular detector, wherein the distance in the feature space controls a range of the traffic characteristics in the feature space that trigger the particular detector; and
      receiving, at the device, a second parameter for the particular detector that controls a tradeoff between recall and precision of the particular detector by controlling a bound for the portion of the features space associated with the particular detector.

* * * * *